(12) United States Patent
Isele et al.

(10) Patent No.: US 11,209,820 B2
(45) Date of Patent: Dec. 28, 2021

(54) SYSTEM AND METHOD FOR PROVIDING AUTONOMOUS VEHICULAR NAVIGATION WITHIN A CROWDED ENVIRONMENT

(71) Applicant: Honda Motor Co., Ltd., Tokyo (JP)

(72) Inventors: David Francis Isele, Sunnyvale, CA (US); Kikuo Fujimura, Palo Alto, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 427 days.

(21) Appl. No.: 16/190,345

(22) Filed: Nov. 14, 2018

(65) Prior Publication Data

US 2020/0150654 A1     May 14, 2020

(51) Int. Cl.
  *G05D 1/00*   (2006.01)
  *G05D 1/02*   (2020.01)
  *G06N 3/08*   (2006.01)

(52) U.S. Cl.
  CPC ......... *G05D 1/0088* (2013.01); *G05D 1/0248* (2013.01); *G06N 3/08* (2013.01)

(58) Field of Classification Search
  CPC ............... G05D 1/0088; G05D 1/0248; G05D 2201/0216; G05D 1/0289; H04W 4/80; H04W 4/024; H04W 4/40; G06N 3/08; G06N 7/005; G06N 3/006
  See application file for complete search history.

(56) References Cited

U.S. PATENT DOCUMENTS

| | | | |
|---|---|---|---|
| 9,760,090 B2* | 9/2017 | Shashua | G06F 16/29 |
| 10,019,011 B1* | 7/2018 | Green | B60W 30/0953 |
| 10,908,606 B2* | 2/2021 | Stein | G06K 9/00798 |
| 2015/0158499 A1* | 6/2015 | Koravadi | G08G 1/164 701/23 |
| 2016/0209845 A1* | 7/2016 | Kojo | G05D 1/0088 |
| 2017/0008521 A1* | 1/2017 | Braunstein | B60W 40/06 |
| 2017/0227962 A1* | 8/2017 | Cesarano | H04B 7/18506 |
| 2017/0248960 A1* | 8/2017 | Shashua | G01C 21/3658 |
| 2017/0336792 A1* | 11/2017 | Gdalyahu | G05D 1/0088 |
| 2017/0336793 A1* | 11/2017 | Shashua | G05D 1/0212 |
| 2017/0336801 A1* | 11/2017 | Shashua | G05D 1/0221 |

(Continued)

OTHER PUBLICATIONS

Gabriel Agamennoni, Juan I Nieto, and Eduardo M Nebot. 2012. Estimation of multivehicle dynamics by considering contextual information. IEEE Transactions on Robotics 28, 4 (2012), 855-870.

(Continued)

*Primary Examiner* — Mussa A Shaawat
(74) *Attorney, Agent, or Firm* — Rankin, Hill & Clark LLP

(57) ABSTRACT

A system and method for providing autonomous vehicular navigation within a crowded environment that include receiving data associated with an environment in which an ego vehicle and a target vehicle are traveling. The system and method also include determining an action space based on the data associated with the environment. The system and method additionally include executing a stochastic game associated with navigation of the ego vehicle and the target vehicle within the action space. The system and method further include controlling at least one of the ego vehicle and the target vehicle to navigate in the crowded environment based on execution of the stochastic game.

20 Claims, 8 Drawing Sheets

(56) References Cited

U.S. PATENT DOCUMENTS

| | | | |
|---|---|---|---|
| 2018/0024562 A1* | 1/2018 | Bellaiche | G06T 7/73 |
| | | | 701/26 |
| 2019/0049950 A1* | 2/2019 | Poornachandran | G05D 1/0088 |
| 2019/0291727 A1* | 9/2019 | Shalev-Shwartz | |
| | | | G01C 21/3602 |
| 2019/0291728 A1* | 9/2019 | Shalev-Shwartz | |
| | | | B60W 40/105 |
| 2019/0295179 A1* | 9/2019 | Shalev-Shwartz | G05D 1/0246 |
| 2019/0299983 A1* | 10/2019 | Shalev-Shwartz | |
| | | | B60W 30/095 |
| 2019/0384294 A1* | 12/2019 | Shashua | G05D 1/0088 |
| 2021/0110484 A1* | 4/2021 | Shalev-Shwartz | B60W 10/04 |

OTHER PUBLICATIONS

Mohammed Alshiekh, Roderick Bloem, Ruediger Ehlers, Bettina Könighofer, Scott Niekum, and Ufuk Topcu. 2018. Safe reinforcement learning via shielding. Proc. AAAI (2018).

John Asmuth, Michael L Littman, and Robert Zinkov. 2008. Potential-based Shaping in Model-based Reinforcement Learning. In AAAI. 604-609.

Michael Bowling and Manuela Veloso. 2000. An analysis of stochastic game theory for multiagent reinforcement learning. Technical Report. Carnegie-Mellon Univ Pittsburgh Pa School of Computer Science.

Michael Bowling and Manuela Veloso. 2001. Rational and convergent learning in stochastic games. In International joint conference on artificial intelligence, vol. 17. Lawrence Erlbaum Associates Ltd, 1021-1026.

Ronen I Brafman and Moshe Tennenholtz. 2002. R-max—a general polynomial time algorithm for near-optimal reinforcement learning. Journal of Machine Learning Research 3, Oct. 2002, 213-231.

Prafulla Dhariwal, Christopher Hesse, Oleg Klimov, Alex Nichol, Matthias Plap-pert, Alec Radford, John Schulman, Szymon Sidor, and Yuhuai Wu. 2017. OpenAI Baselines, https://github.com/openai/baselines. (2017).

Javier Garcia and Fernando Fernández. 2015. A comprehensive survey on safe reinforcement learning. Journal of Machine Learning Research 16, 1 (2015), 1437-1480.

Peter Geibel and Fiilz Wysotzki. 2005. Risk-sensitive reinforcement learning applied to control under constraints. J. Artif. Intell. Res. (JAIR) 24 (2005), 81-108.

Alexander Hans, Daniel Schneegaß, Anton Maximilian Schäfer, and Steffen Udluft. 2008. Safe exploration for reinforcement learning. In ESANN. 143-148.

Matthias Heger. 1994. Consideration of risk in reinforcement learning. In Machine Learning Proceedings 1994. Elsevier, 105-111.

Ronald A Howard and James E Matheson. 1972. Risk-sensitive Markov decision processes. Management science 18, 7 (1972), 356-369.

Junling Hu and Michael P Wellman. 2003. Nash Q-learning for general-sum stochastic games. Journal of machine learning research 4, Nov. 2003, 1039-1069.

Lydia E Kavraki, Petr Svestka, J-C Latombe, and Mark H Overmars. 1996. Probabilistic roadmaps for path planning in high-dimensional configuration spaces. IEEE transactions on Robotics and Automation 12, 4 (1996), 566-580.

Joel Z Leibo, Vinicius Zambaldi, Marc Lanctot, Janusz Marecki, and Thore Graepel. 2017. Multi-agent reinforcement learning in sequential social dilemmas. In Proceedings of the 16th Conference on Autonomous Agents and MultiAgent Systems. International Foundation for Autonomous Agents and Multiagent Systems, 464-473.

Maxim Likhachev, David I Ferguson, Geoffrey J Gordon, Anthony Stentz, and Sebastian Thrun. 2005. Anytime dynamic a*: An anytime, replanning algorithm. In ICAPS. 262-271.

Maxim Likhachev, Geoffrey J Gordon, and Sebastian Thrun. 2004. ARA*: Anytime A* with provable bounds on sub-optimality. In Advances in neural information processing systems. 767-774.

Zachary C Lipton, Jianfeng Gao, Lihong Li, Jianshu Chen, and Li Deng. 2016. Combating Reinforcement Learning's Sisyphean Curse with Intrinsic Fear. arXiv:1611.01211 (2016).

Michael L Littman. 1994. Markov games as a framework for multi-agent reinforcement learning. In Machine Learning Proceedings 1994. Elsevier, 157-163.

Patrick Mannion, Sam Devlin, Karl Mason, Jim Duggan, and Enda Howley. 2017. Policy invariance under reward transformations for multi-objective reinforcement learning. Neurocomputing 263 (2017), 60-73.

Volodymyr Mnih, Koray Kavukcuoglu, David Silver, Andrei A Rusu, Joel Veness, Marc G Bellemare, Alex Graves, Martin Riedmiller, Andreas K Fidjeland, Georg Ostrovski, et al. 2015. Human-level control through deep reinforcement learning. Nature 518, 7540 (2015), 529-533.

Andrew Y Ng, Daishi Harada, and Stuart Russell. 1999. Policy invariance under reward transformations: Theory and application to reward shaping. In ICML, vol. 99. 278-287.

Sébastien Paris, Julien Pettré, and Stéphane Donikian. 2007. Pedestrian reactive navigation for crowd simulation: a predictive approach. In Computer Graphics Forum, vol. 26. Wiley Online Library, 665-674.

Nuria Pelechano, Jan M Allbeck, and Norman I Badler. 2007. Controlling individual agents in high-density crowd simulation. In Proceedings of the 2007 ACM SIGGRAPH/Eurographics symposium on Computer animation. Eurographics Association, 99-108.

John Schulman, Sergey Levine, Pieter Abbeel, Michael Jordan, and Philipp Moritz. 2015. Trust region policy optimization. In International Conference on Machine Learning. 1889-1897.

Shai Shalev-Shwartz, Shaked Shammah, and Amnon Shashua. 2016. Safe, Multi-Agent, Reinforcement Learning for Autonomous Driving. arXiv:1610.03295 (2016).

Richard S Sutton and Andrew G Barto. 1998. Reinforcement learning: An intro-duction. vol. 1. MIT press Cambridge.

Peter Trautman, Jeremy Ma, Richard M Murray, and Andreas Krause. 2013. Robot navigation in dense human crowds: the case for cooperation. In Robotics and Automation (ICRA), 2013 IEEE International Conference on. IEEE, 2153-2160.

Weixun Wang, Jianye Hao, Yixi Wang, and Matthew Taylor. 2018. Towards Co-operation in Sequential Prisoner's Dilemmas: a Deep Multiagent Reinforcement Learning Approach. arXiv preprint arXiv:1803.00162 (2018).

Ziyu Wang, Tom Schaul, Matteo Hessel, Hado Van Hasselt, Marc Lanctot, and Nando De Freitas. 2015. Dueling network architectures for deep reinforcement learning. arXiv preprint arXiv:1511.06581 (2015).

Chen-Yu Wei, Yi-Te Hong, and Chi-Jen Lu. 2017. Online Reinforcement Learning in Stochastic Games. In Advances in Neural Information Processing Systems. 4994-5004.

Min Wen, Rudiger Ehlers, and Ufuk Topcu. 2015. Correct-by-synthesis reinforcement learning with temporal logic constraints. In Intelligent Robots and Systems (IROS), 2015 IEEE/RSJ International Conference on. IEEE, 4983-4990.

Min Wen and Ufuk Topcu. 2016. Probably Approximately Correct Learning in Stochastic Games with Temporal Logic Specifications. In IJCAI. 3630-3636.

* cited by examiner

SYSTEM AND METHOD FOR PROVIDING AUTONOMOUS VEHICULAR NAVIGATION WITHIN A CROWDED ENVIRONMENT

BACKGROUND

Most autonomous driving systems take real time sensor data into account when providing autonomous driving functionality with respect to a crowded environment. In many occasions the sensor data takes objects, roadways, and obstacles into account that may be faced by the vehicle during vehicle operation in real-time. However, these systems do not provide vehicle operation that take into account actions that may be conducted by additional vehicles on the same pathway. In many situations, the vehicles may obstruct one another on the pathway as they are traveling in opposite directions toward one another and as they attempt to navigate to respective end goal locations. Consequently, without taking into account potential actions and determining probabilities of the potential actions, the autonomous driving systems may be limited in executing how well a vehicle may be controlled to adapt to such opposing vehicles within a crowded driving environment.

BRIEF DESCRIPTION

According to one aspect, a computer-implemented method for providing autonomous vehicular navigation within a crowded environment that includes receiving data associated with an environment in which an ego vehicle and a target vehicle are traveling. The computer-implemented method also includes determining an action space based on the data associated with the environment. The computer-implemented method additionally includes executing a stochastic game associated with navigation of the ego vehicle and the target vehicle within the action space. A neural network is trained with stochastic game reward data based on the execution of the stochastic game. The computer-implemented method further includes controlling at least one of the ego vehicle and the target vehicle to navigate in the crowded environment based on execution of the stochastic game.

According to another aspect, a system for providing autonomous vehicular navigation within a crowded environment that includes a memory storing instructions when executed by a processor cause the processor to receive data associated with an environment in which an ego vehicle and a target vehicle are traveling. The instructions also cause the processor to determine an action space based on the data associated with the environment. The instructions additionally cause the processor to execute a stochastic game associated with navigation of the ego vehicle and the target vehicle within the action space. A neural network is trained with stochastic game reward data based on the execution of the stochastic game. The instructions further cause the processor to control at least one of the ego vehicle and the target vehicle to navigate in the crowded environment based on execution of the stochastic game.

According to a further aspect, non-transitory computer readable storage medium storing instructions that when executed by a computer, which includes a processor perform a method. The method includes receiving data associated with an environment in which an ego vehicle and a target vehicle are traveling. The method also includes determining an action space based on the data associated with the environment. The method additionally includes executing a stochastic game associated with navigation of the ego vehicle and the target vehicle within the action space. A neural network is trained with stochastic game reward data based on the execution of the stochastic game. The method further includes controlling at least one of the ego vehicle and the target vehicle to navigate in a crowded environment based on execution of the stochastic game.

DETAILED DESCRIPTION

Figure 1:
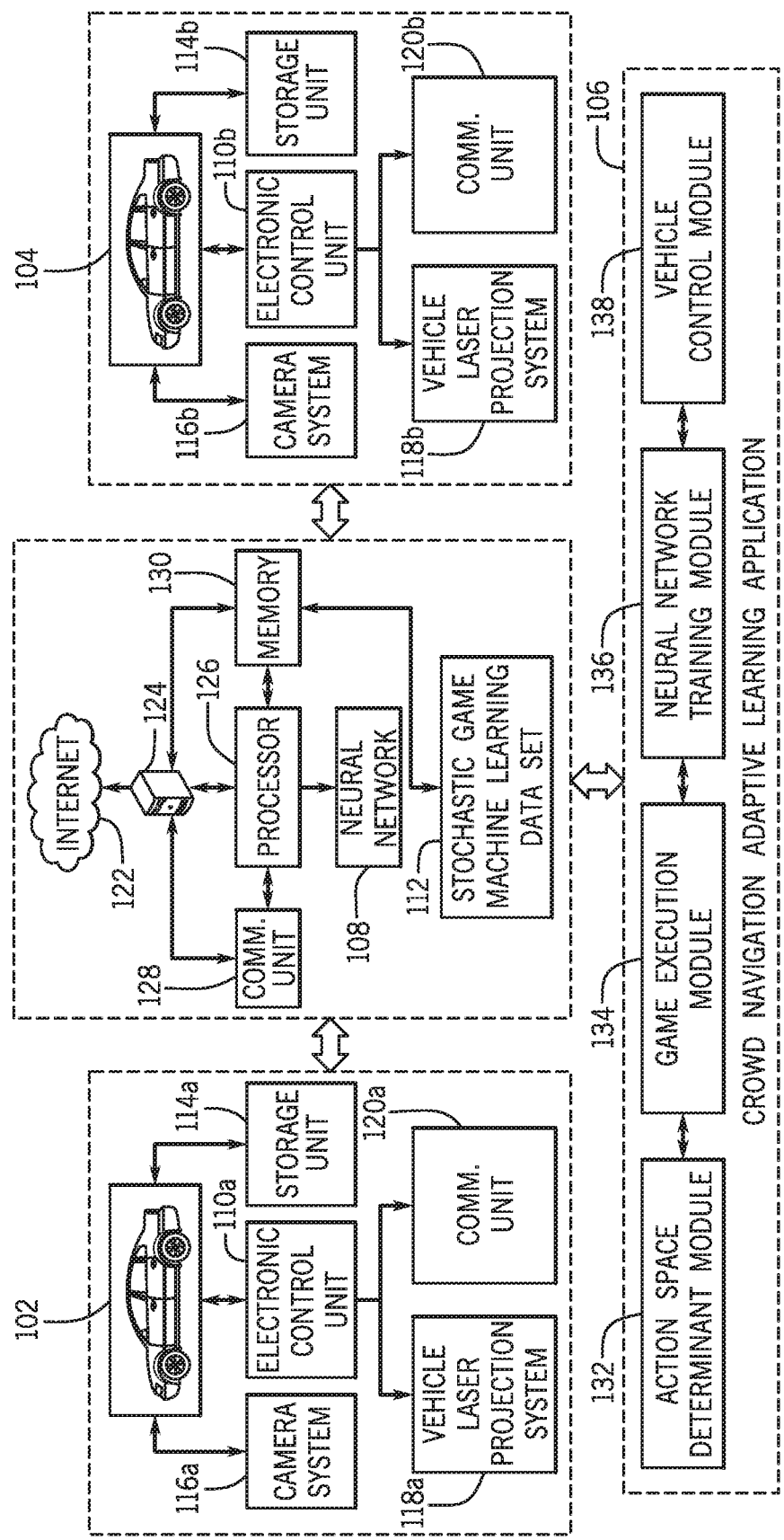
FIG. 1 is a schematic view of an exemplary operating environment for implementing systems and methods for providing autonomous vehicular navigation within a crowded environment according to an exemplary embodiment of the present disclosure.

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary operating environment 100 for implementing systems and methods for providing autonomous vehicular navigation within a crowded environment according to an exemplary embodiment of the present disclosure. The components of the environment 100, as well as the components of other systems, hardware architectures, and software architectures discussed herein, can be combined, omitted, or organized into different architectures for various embodiments.

Generally, the environment 100 includes an ego vehicle 102 and a target vehicle 104. However, it is appreciated that the environment 100 may include more than one ego vehicle 102 and more than one target vehicle 104. As discussed below, the ego vehicle 102 may be controlled to autonomously navigate in a crowded environment that is determined to include the target vehicle 104 that may be traveling in one or more opposing directions of the ego vehicle 102. The one or more opposing directions of the ego vehicle 102 may include one or more locations of one or more pathways that include and/or may intersect the pathway that the ego vehicle 102 is traveling upon within the crowded environment. For example, the one or more opposing directions may include a location on a pathway that is opposing another location of the pathway. Accordingly, the ego vehicle 102 and the target vehicle 104 may be traveling toward each other as they are opposing one another.

In an exemplary embodiment, the environment 100 may include a crowd navigation adaptive learning application (crowd navigation application) 106 that may utilize stochastic gaming of multiple scenarios that include the ego vehicle 102 and the target vehicle 104 traveling in one or more opposing directions of one another. As discussed in more detail below, the crowd navigation application 106 may execute one or more iterations of a stochastic game to thereby train a neural network 108 with reward data. The reward data may be based on one or more various reward formats that are utilized in one or more domain models (models of virtual representation of a real-world crowded environment, described herein as an action space) during the one or more iterations of the stochastic game. As discussed below, the reward data may be associated with the ego vehicle 102 and/or the target vehicle 104 and may be analyzed to determine one or more travel paths that may be utilized to autonomously control the ego vehicle 102 and/or the target vehicle 104.

In particular, the training of the neural network 108 may allow the crowd navigation application 106 to communicate data to control autonomous driving of the ego vehicle 102 and/or the target vehicle 104 to thereby negotiate through the crowded environment to reach a respective end goal (e.g., a geo-position marker that is located on the way to an intended destination, a point of interest, a pre-programmed destination, a drop-off location, a pick-up location). In addition to the target vehicle 104 traveling in one or more opposing directions of the ego vehicle 102 and the ego vehicle 102 traveling in one or more opposing directions to the target vehicle 104, the crowded environment may include boundaries of a pathway that is traveled upon by the ego vehicle 102 and the target vehicle 104 and/or one or more additional objects (e.g. construction cones, barrels, signs) that may be located on or in proximity of the pathway traveled by the ego vehicle 102 and the target vehicle 104.

Accordingly, the application 106 allows the ego vehicle 102 and the target vehicle 104 to safely and efficiently navigate to respective end goals in the crowded environment. Stated differently, the application 106 allows the ego vehicle 102 and/or the target vehicle 104 to be autonomously controlled based on reward data by executing one or more iterations of the stochastic game to train the neural network 108. Such data may be utilized by the application 106 to perform real-time decision making to thereby take into account numerous potential navigable pathways within the crowded environment to reach respective end goals that may be utilized by the ego vehicle 102 and/or the target vehicle 104. Accordingly, the training of the potential navigable pathways may be utilized to autonomously control the ego vehicle 102 and/or the target vehicle 104 in the crowded environment and/or similar crowded environments to safely and efficiently navigate to their respective end goals.

In one or more configurations, the ego vehicle 102 and the target vehicle 104 may include, but may not be limited to, an automobile, a robot, a forklift, a bicycle, an airplane, a construction crane, and the like that may be traveling within one or more types of crowded environments. The crowded environment may include, but may not be limited to areas that are evaluated to provide navigable pathways for the ego vehicle 102 and/or the target vehicle 104. For example, the crowded environment may include, but may not be limited to, a roadway such a narrow street or tunnel and/or a pathway that may exist within a confined location such as a factory floor, a construction site, or an airport taxiway.

In one embodiment, the crowd navigation application 106 may determine an action space as a virtual model of the crowded environment that replicates the real-world crowded environment. The action space may be determined based on image data and/or LiDAR data that may be provided to the application 106 by one or more components of the ego vehicle 102 and/or the target vehicle 104 and may be utilized as a gaming environment during the execution of one or more iterations of the stochastic game.

Figure 2:
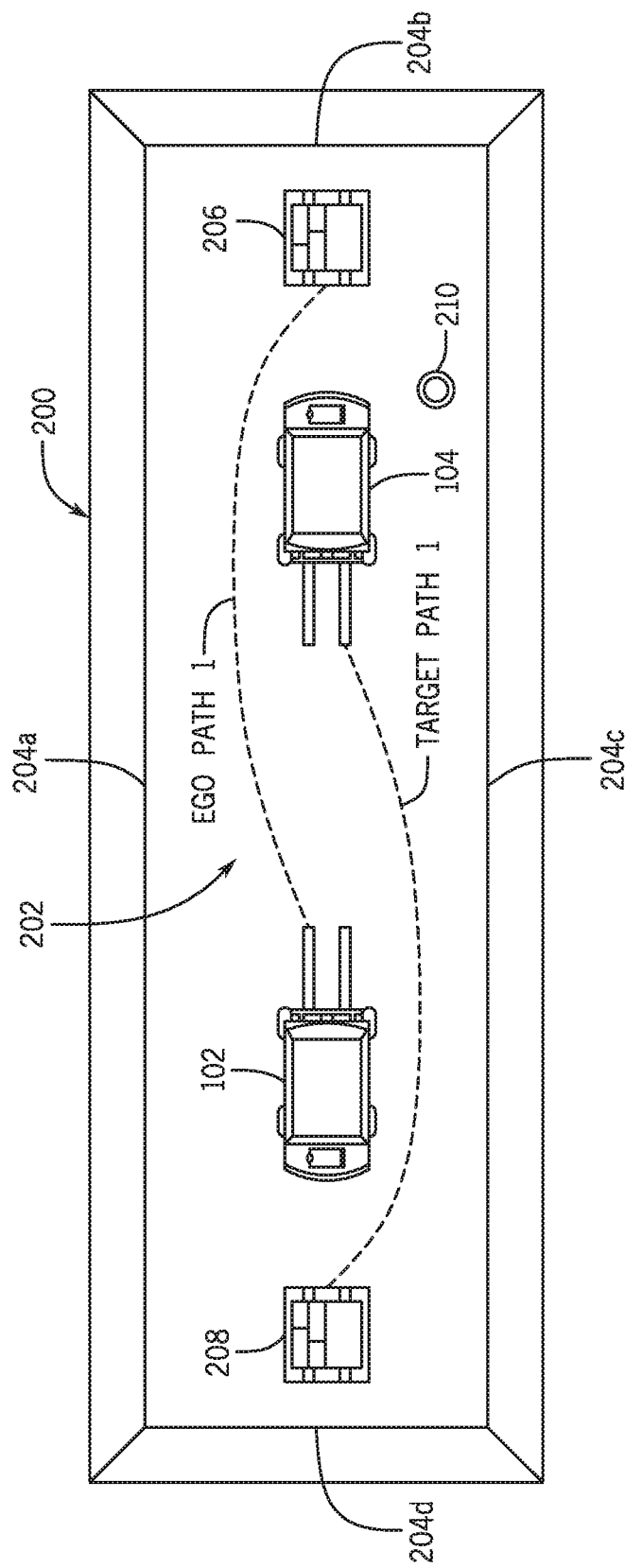
FIG. 2 is an illustrative example of a crowded environment according to an exemplary embodiment of the present disclosure.

As shown in the illustrative example of FIG. 2, the crowded environment 200 (e.g., which is configured as a warehouse floor) may include a pathway 202 that is defined by boundaries 204a-204d (e.g., borders/edges of the pathway 202). The ego vehicle 102 may be configured as a forklift (e.g., autonomous forklift) that may be traveling on the pathway 202 towards an end goal 206 (e.g., a palette). The crowded environment 200 may additionally include a target vehicle 104 that may be also be configured as a forklift (e.g., autonomous forklift). As shown, the target vehicle 104 is traveling towards an end goal 208 (e.g., a palette) and is traveling at a direction that is opposing the ego vehicle 102.

With continued reference to FIG. 2, the crowd navigation application 106 may evaluate reward data that is stored on a stochastic game machine learning dataset 112. The reward data may be assigned to the ego vehicle 102 and the target vehicle 104 based on the execution of one or more stochastic games that pertain to the crowded environment 200, and more specifically, to the pathway 202 of the crowded environment 200, the potential trajectories of the ego vehicle 102, and potential trajectories of the target vehicle 104 to thereby determine an optimal pathway for the ego vehicle 102 and/or the target vehicle 104 to travel to safely reach their respective end goals 206, 208 without intersecting.

Referring again to FIG. 1, the ego vehicle 102 and the one or more target vehicles 104 may include respective electronic control devices (ECUs) 110a, 110b. The ECUs 110a, 110b may execute one or more applications, operating systems, vehicle system and subsystem executable instructions, among others. In one or more embodiments, the ECUs 110a, 110b may include a respective microprocessor, one or more application-specific integrated circuit(s) (ASIC), or other similar devices. The ECUs 110a, 110b may also include respective internal processing memory, an interface circuit, and bus lines for transferring data, sending commands, and communicating with the plurality of components of the vehicle 102.

The ECUs 110a, 110b may also include a respective communication device (not shown) for sending data internally to components of the respective vehicles 102, 104 and communicating with externally hosted computing systems (e.g., external to the vehicles 102, 104). Generally, the ECUs 110a, 110b communicate with respective storage units 114a, 114b to execute the one or more applications, operating systems, vehicle systems and subsystem user interfaces, and the like that are stored within the respective storage units 114a, 114b.

In an exemplary embodiment, the ECUs 110a, 110b may be configured to operably control the plurality of components of the respective vehicles 102, 104. The ECUs 110a, 110b may additionally provide one or more commands to one or more control units (not shown) of the vehicles 102, 104 including, but not limited to a respective engine control unit, a respective braking control unit, a respective transmission control unit, a respective steering control unit, and the like to control the ego vehicle 102 and/or target vehicle 104 to be autonomously driven.

In an exemplary embodiment, one or both of the ECU 110a, 110b may autonomously control the vehicle 102 based on the stochastic game machine learning dataset 112. In particular, the application 106 may evaluate the dataset 112 and may communicate with the ECUs 110a, 110b to navigate the ego vehicle 102 and/or the target vehicle 104 toward respective end goals 206, 208 based on reward data output from execution of one or more iterations of the stochastic game. Such reward data may be associated to one or more rewards that pertain to one or more paths that are followed to virtually (e.g., electronically based on the electronic execution of the stochastic game) reach respective virtual end goals or virtually obstruct and deny virtual representations of the ego vehicle 102 and/or the target vehicle 104 from reaching respective virtual end goals.

As an illustrative example, referring again to FIG. 2, the autonomous control of the ego vehicle 102 and/or the target vehicle 104 may be based on the reward data that is associated to one or more paths that are followed by the ego vehicle 102 and/or the target vehicle 104. As shown, two exemplary paths designated by the dashed lines designated as ego path 1 and target path 1 are illustrated within the illustrative example of FIG. 2 and may be selected based on the execution of one or more iterations of the stochastic game by the application 106 to safely and efficiently navigate the vehicles 102, 104 to their respective goals.

It is appreciated that a plurality of virtual paths that may be evaluated based on the execution of one or more iterations of the stochastic game and reward data (based on positive or negative rewards) may be allocated to the ego vehicle 102 and/or the target vehicle 104 based on virtual paths followed by virtual representations of the ego vehicle 102 and/or the target vehicle 104. The allocated rewards may be communicated as the reward data and may be utilized to train the neural network 108 to provide data to the crowd navigation application 106 to thereby autonomously control the ego vehicle 102 and/or the target vehicle 104 to safely and efficiently reach their respective end goals 206, 208 by respective selected travel paths such as the ego path 1 and target path 1 within the crowded environment 200.

Referring again to FIG. 1, the respective storage units 114a, 114b of the ego vehicle 102 and the target vehicle 104 may be configured to store one or more executable files associated with one or more operating systems, applications, associated operating system data, application data, vehicle system and subsystem user interface data, and the like that are executed by the respective ECUs 110a, 110b. In one or more embodiments, the storage units 114a, 114b may be accessed by the crowd navigation application 106 to store data, for example, one or more images, videos, one or more sets of image coordinates, one or more sets of LiDAR coordinates (e.g., LiDAR coordinates associated with the position of an object), one or more sets of locational coordinates (e.g., GPS/DGPS coordinates) and/or vehicle dynamic data associated respectively with the ego vehicle 102 and the target vehicle 104.

The ECUs 110a, 110b may be additionally configured to operably control respective camera systems 116a, 116b of the ego vehicle 102 and the target vehicle 104. The camera systems 116a, 116b may include one or more cameras that are positioned at one or more exterior portions of the respective vehicles 102, 104. The camera(s) of the camera systems 116a, 116b may be positioned in a direction to capture the surrounding environment of the respective vehicles 102, 104. In an exemplary embodiment, the surrounding environment of the respective vehicles 102, 104 may be defined as a predetermined area located around (front/sides/behind) the respective vehicles 102, 104 that includes the crowded environment 200.

In one configurations, the one or more cameras of the respective camera systems 116a, 116b may be disposed at external front, rear, and/or side portions of the respective vehicles 102, 104 including, but not limited to different portions of the bumpers, lighting units, fenders/body panels, and/or windshields. The one or more cameras may be positioned on a respective planar sweep pedestal (not shown) that allows the one or more cameras to be oscillated to capture images of the surrounding environments of the respective vehicles 102, 104.

With respect to the ego vehicle 102, the crowd navigation application 106 may receive image data associated with untrimmed images/video of the surrounding environment of the ego vehicle 102 from the camera system 116a and may execute image logic to analyze the image data and determine one or more sets of image coordinates associated with the crowded environment 200, and more specifically the pathway 202 on which the ego vehicle 102 is traveling, one or more target vehicles 104 that may be located on the pathway 202 (and may be traveling in an opposing direction of the ego vehicle 102), one or more boundaries 204a-204d of the pathway 202, and/or one or more objects 210 that may be located on or in proximity of the pathway 202 and/or within the crowded environment 200.

With respect to the target vehicle 104, the crowd navigation application 106 may receive image data associated with untrimmed images/video of the surrounding environments of the target vehicle 104 from the camera system 116b and may execute image logic to analyze the image data and determine one or more sets of image coordinates associated with the crowded environment 200, and more specifically the pathway 202 on which the target vehicle 104 is traveling, the ego vehicle 102 that may be located on the pathway 202 (and may be traveling in an opposing direction of the target vehicle 104), one or more boundaries 204a-204d of the pathway, and/or one or more objects 110 that may be located on or in proximity the pathway 202 and/or within the crowded environment 200.

In one or more embodiments, the ECUs 110a, 110b may also be operably connected to respective vehicle laser projection systems 118a, 118b that may include one or more respective LiDAR transceivers (not shown). The one or more respective LiDAR transceivers of the respective vehicle laser projection systems 118a, 118b may be disposed at respective external front, rear, and/or side portions of the respective vehicles 102, 104, including, but not limited to different portions of bumpers, body panels, fenders, lighting units, and/or windshields.

The one or more respective LiDAR transceivers may include one or more planar sweep lasers that include may be configured to oscillate and emit one or more laser beams of ultraviolet, visible, or near infrared light toward the surrounding environment of the respective vehicles 102, 104. The vehicle laser projection systems 118a, 118b may be configured to receive one or more reflected laser waves based on the one or more laser beams emitted by the LiDAR transceivers. The one or more reflected laser waves may be reflected off of one or more boundaries 204a-204d (e.g., guardrails) of the pathway 202, and/or one or more objects 110 (e.g., other vehicles, cones, pedestrians, etc.) that may be located on or in proximity to the pathway 202 and/or within the crowded environment 200.

In an exemplary embodiment, the vehicle laser projection systems 118a, 118b may be configured to output LiDAR data associated to one or more reflected laser waves. With respect to the ego vehicle 102, the crowd navigation application 106 may receive LiDAR data communicated by the vehicle laser projection system 118a and may execute LiDAR logic to analyze the LiDAR data and determine one or more sets of object LiDAR coordinates (sets of LiDAR coordinates) associated with the crowded environment 200, and more specifically the pathway 202 on which the ego vehicle 102 is traveling, one or more target vehicles 104 that may be located on the pathway 202 (and may be traveling in an opposing direction of the ego vehicle 102), one or more boundaries 204a-204d of the pathway 202, and/or one or more objects 110 that may be located on or in proximity of the pathway 202 and/or within the crowded environment 200.

With respect to the target vehicle 104, the crowd navigation application 106 may receive LiDAR data communicated by the vehicle laser projection system 118b and may execute LiDAR logic to analyze the LiDAR data and determine one or more sets of LiDAR coordinates (sets of LiDAR coordinates) associated with the crowded environment 200, and more specifically the pathway on which the target vehicle 104 is traveling, the ego vehicle 102 that may be located on the pathway 202 (and may be traveling in an opposing direction of the target vehicle 104), one or more boundaries 204a-204d of the pathway 202, and/or one or more objects 210 that may be located on or in proximity of the pathway 202 and/or within the crowded environment 200.

The ego vehicle 102 and the target vehicle 104 may additionally include respective communication units 120a, 120b that may be operably controlled by the respective ECUs 110a, 110b of the respective vehicles 102, 104. The communication units 120a, 120b may each be operably connected to one or more transceivers (not shown) of the respective vehicles 102, 104. The communication units 120a, 120b may be configured to communicate through an internet cloud 122 through one or more wireless communication signals that may include, but may not be limited to Bluetooth® signals, Wi-Fi signals, ZigBee signals, Wi-Max signals, and the like. In some embodiments, the communication unit 120a of the ego vehicle 102 may be configured to communicate via vehicle-to-vehicle (V2V) with the communication unit 120b of the target vehicle 104 to exchange information about the position and speed of the vehicles 102, 104 traveling on the pathway 202 within the crowded environment 200.

In one embodiment, the communication units 120a, 120b may be configured to connect to the internet cloud 122 to send and receive communication signals to and from an externally hosted server infrastructure (external server) 124. The external server 124 may host the neural network 108 and may execute the crowd navigation application 106 to utilize processing power to execute one or more iterations of the stochastic game to thereby train the neural network 108 with reward data. In particular, the neural network 108 may be utilized for each iteration of the stochastic game that is executed for the ego vehicle 102 and the target vehicle 104 that are traveling in one or more opposing directions of one another within the crowded environment 200.

In an exemplary embodiment, components of the external server 124 including the neural network 108 may be operably controlled by a processor 126. The processor 126 may be configured to operably control the neural network 108 to utilize machine learning/deep learning to provide artificial intelligence capabilities that may be utilized to build the stochastic game machine learning dataset 112. In one embodiment, the processor 126 may be configured to process information derived from one or more iterations of the stochastic game into rewards based on one or more reward formats that may be applied within one or more iterations of the stochastic game.

In some embodiments, the processor 126 may be utilized to execute one or more machine learning/deep learning algorithms (e.g., image classification algorithms) to allow the neural network 108 to provide various functions, that may include, but may not be limited to, object classification, feature recognition, computer vision, speed recognition, machine translation, autonomous driving commands, and the like. In one embodiment, the neural network 108 may be configured as a convolutional neural network (CNN) that may be configured to receive inputs in the form of data from the application 106 and may flatten the data and concatenate the data to output information.

In one configuration, the neural network 108 may be utilized by the crowd navigation application 106 to execute one or more iterations of the stochastic game in two different model variants of the action space that may include a discrete domain model and a continuous domain model. Within the discrete domain model, virtual representations of the ego vehicle 102 and the target vehicle 104 may have four discrete action options: up, down, left, and/or right. Within the discrete domain model the virtual representations of the ego vehicle 102 and/or the target vehicle 104 may be configured to stop moving upon reaching a respective end goal 206, 208.

Within the continuous domain model, virtual representations of the ego vehicle 102 and the target vehicle 104 may move forward, backward, and/or rotate. Within each stochastic game within the continuous domain model, the determined action space is represented as two dimensional. Control of the virtual representation of the ego vehicle 102 and/or the target vehicle 104 may be made by accelerating and rotating. The rotations may be bounded by $\pm \pi/8$ per time step and accelerations may be bounded by $\pm 1.0$ m/s$^2$. The control may be selected to ensure that the virtual representations of the ego vehicle 102 and/or the target vehicle 104 may not instantaneously stop.

With continued reference to the external server 124, the processor 126 may additionally be configured to communicate with a communication unit 128. The communication unit 128 may be configured to communicate through the internet cloud 122 through one or more wireless communication signals that may include, but may not be limited to Bluetooth® signals, Wi-Fi signals, ZigBee signals, Wi-Max signals, and the like. In one embodiment, the communication unit 128 may be configured to connect to the internet cloud 122 to send and receive communication signals to and from the ego vehicle 102 and/or the target vehicle 104. In particular, the external server 124 may receive image data and LiDAR data that may be communicated by the ego vehicle 102 and/or the target vehicle 104 based on the utilization of one or more of the camera systems 116a, 116b and the vehicle laser projection systems 118a, 118b.

With continued reference to the external server 124, the processor 126 may be operably connected to a memory 130. The memory 130 may store one or more operating systems, applications, associated operating system data, application data, executable data, and the like. In particular, the memory 130 may be configured to store the stochastic game machine learning dataset 112 that is updated by the crowd navigation application 106 based on the execution of one or more iterations of the stochastic game.

In one or more embodiments, the stochastic game machine learning dataset 112 may be configured as a data set that includes one or more fields associated with each of the ego vehicle 102 and the target vehicle 104 with travel pathway geo-location information associated with one or more perspective pathways that may be determined to be utilized by the ego vehicle 102 and/or the target vehicle 104 to reach the respective end goals 206, 208. As discussed, the one or more perspective pathways may be based on rewards assigned through one or more iterations of the stochastic game. In one embodiment, each of the fields that are associated to respective potential travel paths may include rewards and related reward format data that are associated to each of the ego vehicle 102 and/or the target vehicle 104. Accordingly, one or more rewards may be associated with the ego vehicle 102 and/or the target vehicle 104 and may be populated within the fields that are associated with the respective potential travel paths utilized by the respective vehicles 102, 104.

II. The Crowd Navigation Adaptive Learning Application and Related Methods

The components of the crowd navigation application 106 will now be described according to an exemplary embodiment and with reference to FIG. 1. In an exemplary embodiment, the crowd navigation application 106 may be stored on the memory 130 and executed by the processor 126 of the external server 124. In another embodiment, the crowd navigation application 106 may be stored on the storage unit 114*a* of the ego vehicle 102 and may be executed by the ECU 110*a* of the ego vehicle 102. In some embodiments, in addition to be stored and executed by the external server 124 and/or by the ego vehicle 102, the application 106 may also be executed by the ECU 110*b* of the target vehicle 104.

The general functionality of the crowd navigation application 106 will now be discussed. In an exemplary embodiment, the crowd navigation application 106 may include an action space determinant module 132, a game execution module 134, a neural network training module 136, and a vehicle control module 138. However, it is to be appreciated that the crowd navigation application 106 may include one or more additional modules and/or sub-modules that are included in addition to the modules 132-138. Methods and examples describing process steps that are executed by the modules 132-138 of the crowd navigation application 106 will now be described in more detail.

Figure 3:
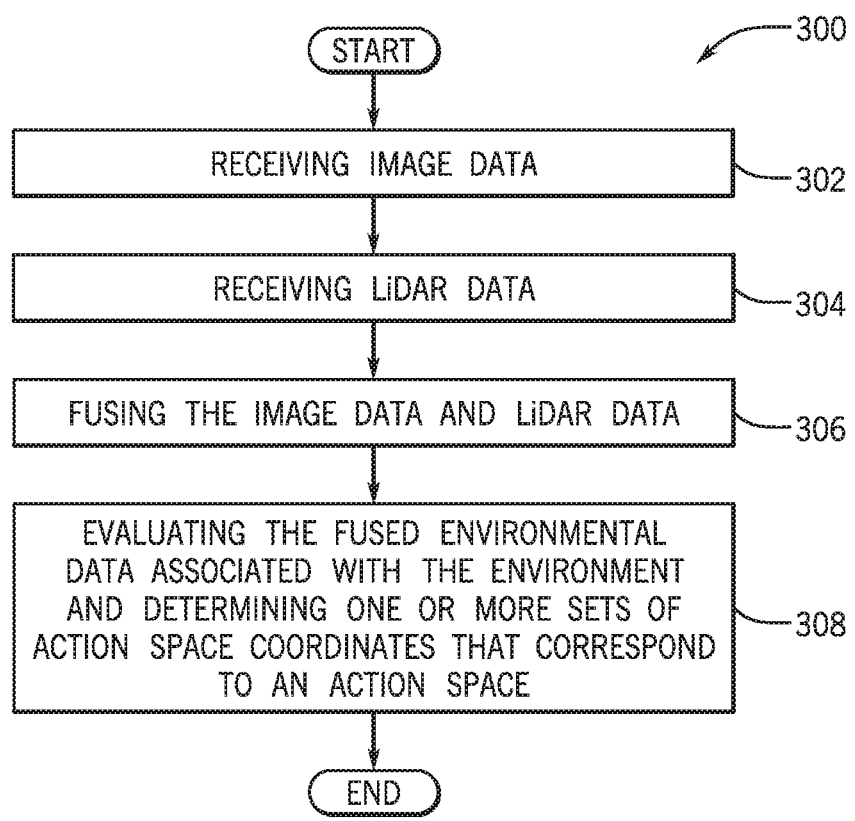
FIG. 3 is process flow diagram of a method for receiving data associated with the crowded environment in which an ego vehicle and a target vehicle are traveling and determining an action space that virtually represents the crowded environment according to an exemplary embodiment of the present disclosure.

FIG. 3 is a process flow diagram of a method 300 for receiving data associated with the crowded environment 200 in which the ego vehicle 102 and the target vehicle 104 are traveling and determining the action space that virtually represents the crowded environment 200 according to an exemplary embodiment of the present disclosure. FIG. 3 will be described with reference to the components of FIG. 1, FIG. 2, FIG. 5A, and FIG. 5B, though it is to be appreciated that the method of FIG. 3 may be used with other systems/components. As discussed above, the action space may be determined by the application 106 as a virtual representation (virtual model) of the crowded environment 200 to be utilized during the one or more iterations of the stochastic game. The action space may be determined by the application 106 as a virtual gaming environment that is utilized for the stochastic game and evaluated to provide a navigable pathway for the ego vehicle 102 and/or the target vehicle 104 to reach their respective end goals 206, 208 within the crowded environment 200.

In an exemplary embodiment, the method 300 may begin at block 302, wherein the method 300 may include receiving image data. In one embodiment, the action space determinant module 132 may communicate with the camera system 116*a* of the ego vehicle 102 and/or the camera system 116*b* of the target vehicle 104 to collect untrimmed images/video of the surrounding environment of the vehicles 102, 104. The untrimmed images/video may include a 360 degree external views of the surrounding environments of the vehicles 102, 104.

With reference to the illustrative example of FIG. 2, from the perspective of the ego vehicle 102, such views may include the opposing target vehicle 104, the end goal 206 of the ego vehicle 102, any objects 210 on or in proximity of the pathway 202, and boundaries 204*a*-204*d* of the pathway 202. Additionally, from the perspective of the target vehicle 104, such views may include the opposing ego vehicle 102, the end goal 208 of the target vehicle 104, any objects 210 on or near the pathway 202, and boundaries 204*a*-204*d* of the pathway 202. In one embodiment, the action space determinant module 132 may package and store the image data received from the camera system 116*a* and/or the image data received from the camera system 116*b* on the memory 130 of the external server 124 to be further evaluated by the action space determinant module 132.

The method 300 may proceed to block 304, wherein the method 300 may include receiving LiDAR data. In an exemplary embodiment, the action space determinant module 132 may communicate with the vehicle laser projection system 118*a* of the ego vehicle 102 and/or the vehicle laser projection system 118*b* of the target vehicle 104 to collect LiDAR data that classifies set(s) of LiDAR coordinates (e.g., three-dimensional LiDAR object coordinate sets) from one or more perspectives of the ego vehicle 102 and/or the target vehicle 104. The set(s) of LiDAR coordinates may indicate the location, range, and positions of the one or more objects off which the reflected laser waves were reflected with respect to a location/position of the respective vehicles 102, 104.

With reference again to FIG. 2, from the perspective of the ego vehicle 102, the action space determinant module 132 may communicate with the vehicle laser projection system 118*a* of the ego vehicle 102 to collect LiDAR data that classifies sets of LiDAR coordinates that are associated with the opposing target vehicle 104, the end goal 206 of the ego vehicle 102, any objects on or in proximity of the pathway 202, and boundaries 204*a*-204*d* of the pathway 202. Additionally, from the perspective of the target vehicle 104, the action space determinant module 132 may communicate with the vehicle laser projection system 118*b* of the ego vehicle 102 to collect LiDAR data that classifies sets of LiDAR coordinates that are associated with the opposing ego vehicle 102, the end goal 208 of the target vehicle 104, any objects on or near the pathway 202, and boundaries 204*a*-204*d* of the pathway 202. In one embodiment, the action space determinant module 132 may package and store the LiDAR data received from the vehicle laser projection system 118*a* and/or the LiDAR data received from the vehicle laser projection system 118*b* on the memory 130 of the external server 124 to be further evaluated by the action space determinant module 132.

The method 300 may proceed to block 306, wherein the method 300 may include fusing the image data and LiDAR data. In an exemplary embodiment, the action space determinant module 132 may communicate with the neural network 108 to provide artificial intelligence capabilities to conduct multimodal fusion of the image data received from the camera system 116*a* of the ego vehicle 102 and/or the camera system 116*b* of the target vehicle 104 with the LiDAR data received from the vehicle laser projection system 118*a* of the ego vehicle 102 and/or the vehicle laser projection system 118*b* of the target vehicle 104. The action space determinant module 132 may aggregate the image data and the LiDAR data into fused environmental data that is associated with the crowded environment 200 and is to be evaluated further by the module 134.

As an illustrative example, the action space determinant module 132 may communicate with the neural network 108 to provide artificial intelligence capabilities to utilize one or more machine learning/deep learning fusion processes to aggregate the image data received from the camera system 116a of the ego vehicle 102 and the image data received from the camera system 116b of the target vehicle 104 into aggregated image data.

The action space determinant module 132 may also utilize the neural network 108 to provide artificial intelligence capabilities to utilize one or more machine learning/deep learning fusion processes to aggregate the LiDAR data received from the vehicle laser projection system 118a of the ego vehicle 102 and the LiDAR data received from the vehicle laser projection system 118a of the target vehicle 104 into aggregated LiDAR data. The action space determinant module 132 may additionally employ the neural network 108 to provide artificial intelligence capabilities to utilize one or more machine learning/deep learning fusion processes to aggregate the aggregated image data and the aggregated LiDAR data into fused environmental data.

The method 300 may proceed to block 308, wherein the method 300 may include evaluating the fused environmental data associated with the environment and determining one or more sets of action space coordinates that correspond to an action space that virtually represents the crowded environment 200. In an exemplary embodiment, the action space determinant module 132 may communicate with the neural network 108 to utilize one or more machine learning/deep learning fusion processes to evaluate the fused environmental data to determine one or more sets of action space coordinates. The one or more sets of action space coordinates may include positional coordinates (e.g., x, y grid world coordinates) that represent the ego vehicle 102, the target vehicles 104, the boundaries of the pathway, one or more end goals associated with the ego vehicle 102 and/or the target vehicle 104 (defined based on the source of the image data and/or the LiDAR data), and any objects on or near the pathway.

Referring again to the illustrative example of FIG. 2, the one or more sets of action space coordinates may include positional coordinates that represent the ego vehicle 102, the end goal 206 of the ego vehicle 102, the target vehicle 104, and the end goal 208 of the target vehicle 104. The one or more sets of action space coordinates may also include positional coordinates that represent the boundaries 204a-204d of the pathway 204 that define the pathway 204.

The one or more sets of action space coordinates may thereby define the action space as a virtual grid world that is representative of the real-world crowded environment 200 of the ego vehicle 102 and the target vehicle 104 to be utilized for the stochastic game. As discussed below, the virtual grid world includes a virtual ego agent that represents the ego vehicle 102 and a virtual target agent that represents the target vehicle 104 along with virtual markers that may represent respective end goals 206, 208, one or more objects, and the boundaries 204a-d of the pathway 202.

Figure 4:
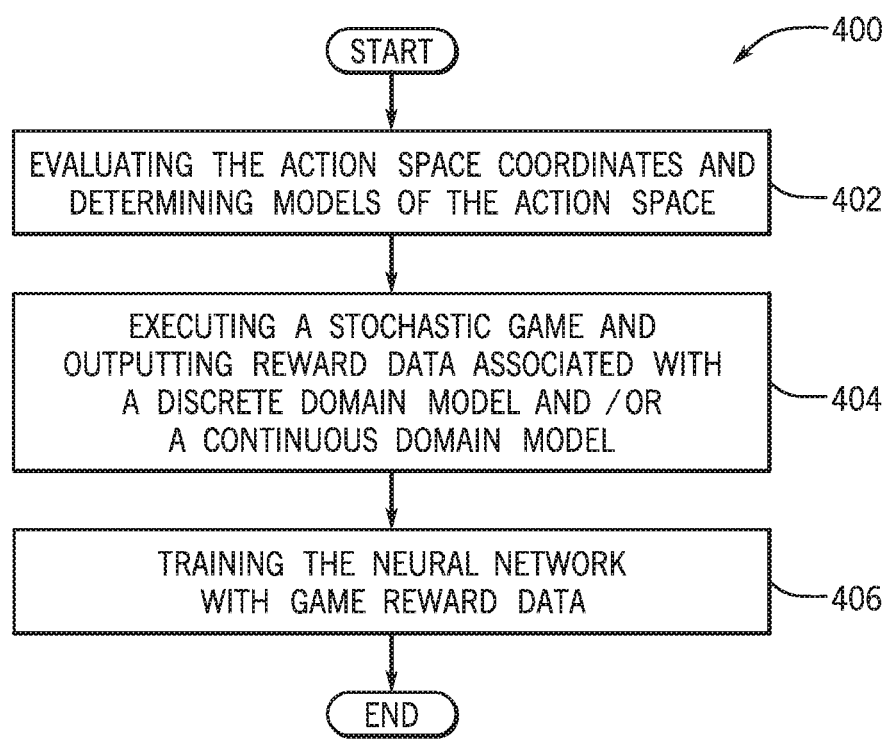
FIG. 4 is a process flow diagram of a method for executing stochastic games associated with navigation of the ego vehicle and the target vehicle within the crowded environment according to an exemplary embodiment of the present disclosure.

FIG. 4 is a process flow diagram of a method 400 for executing stochastic games associated with navigation of the ego vehicle 102 and the target vehicle 104 within the crowded environment 200 according to an exemplary embodiment of the present disclosure. FIG. 4 will be described with reference to the components of FIG. 1, FIG. 2, FIG. 5A, and FIG. 5B, though it is to be appreciated that the method of FIG. 4 may be used with other systems/components. The method 400 may begin at block 402, wherein the method 400 may include evaluating the action space coordinates and determining models of the action space.

In an exemplary embodiment, upon determining the one or more sets of action space coordinates (at block 308 of the method 300), the action space determinant module 132 may communicate data pertaining to the one or more action space coordinates to the game execution module 134. The game execution module 134 may evaluate each of the one or more action space coordinates and may thereby determine models of the action space to be utilized in one or more iterations of the stochastic game.

Figure 5A:
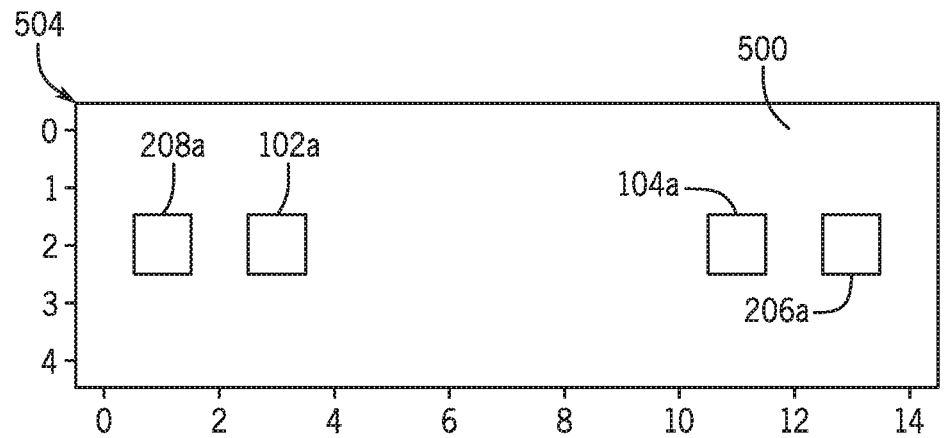
FIG. 5A is an illustrative example of a discrete domain model of the action space according to an exemplary embodiment of the present disclosure.
Figure 5B:
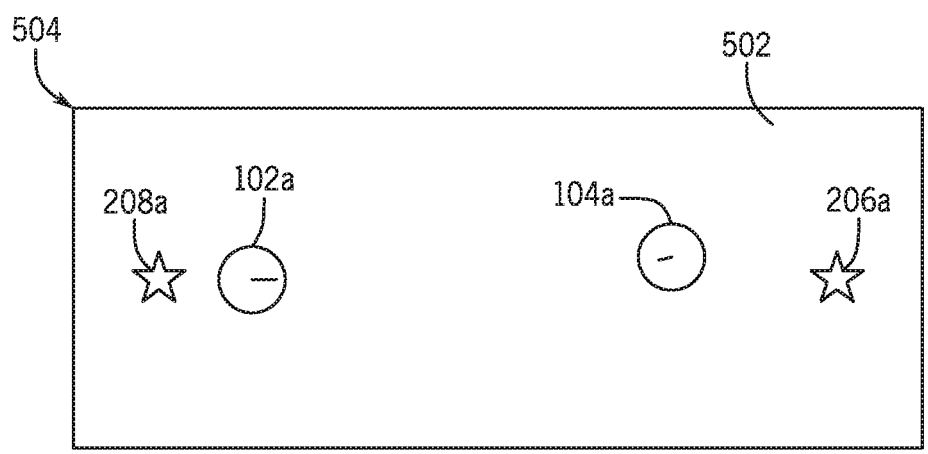
FIG. 5B is an illustrative example of the continuous domain model of the action space according to an exemplary embodiment of the present disclosure.

As represented in the illustrative examples of FIG. 5A and FIG. 5B, the models of the action space may include a virtual model of the ego vehicle 102 provided as a virtual ego agent 102a that is presented in a respective location of a virtual action space that replicates the real-world surrounding environment of the ego vehicle 102 (within the crowded environment 200). The models of the action space may also include a virtual model of the target vehicle 104 that are provided as a virtual target agent 104a that is presented in a respective location of a virtual action space that replicates the real-world surrounding environment of the target vehicle 104 (within the crowded environment 200). As discussed below, one or more iterations of the stochastic game may be executed with respect to the virtual ego agent 102a representing the real-world ego vehicle 102 and the virtual target agent 104a representing the real-world target vehicle 104 to determine one or more (real-world) travel paths that may be utilized by the ego vehicle 102 and/or the target vehicle 104 to reach their respective end goals in the real-world crowded environment 200.

In one embodiment, the action space may be created as a discrete domain model and a continuous domain model. With particular reference to FIG. 5A which includes an illustrative example of the discrete domain model 500 of the action space, the virtual ego agent 102a representing the real-world ego vehicle 102 and the virtual target agent 104a representing the real-world target vehicle 104 may be determined to occupy the discrete domain model 500 in a two-dimensional grid in order to navigate to their respective virtual end goals 206a, 208a (virtually represented for the stochastic game).

In one configuration, with reference to FIG. 5B, an illustrative example of the continuous domain model 502 of the action space, the model 502 may be included as having two dimensional Cartesian coordinates. The continuous domain model 502 may be represented as a vector with four real values parameters that are respectively associated with the virtual ego agent 102a and the virtual target agent 104a. With respect to the virtual ego agent 102a, the four real value parameters may correspond to the position of the virtual ego agent 102a, the velocity of the virtual ego agent 102a, and the rotation of the virtual ego agent 102a: $\{x, y, v, \theta\}$. Similarly, with respect to the virtual target agent 104a, the four real value parameters may correspond to the position of the virtual ego agent 102a, the velocity of the virtual ego agent 102a, and the rotation of the virtual ego agent 102a: $\{x, y, v, \theta\}$.

In an exemplary embodiment, upon determining the discrete domain model 500 and the continuous domain model 502, the game execution module 134 may execute one or more iterations of the stochastic game using the discrete domain model 500 and the continuous domain model 502. With continued reference to FIG. 4, the method 400 may thereby proceed to block 404, wherein the method 400 may include executing a stochastic game and outputting reward data associated with a discrete domain model and/or a continuous domain model.

In an exemplary embodiment, the game execution module 134 may execute one or more iterations of the stochastic game to determine probabilistic transitions with respect to a set of the virtual ego agent's and the virtual target agent's actions. The one or more iterations of the stochastic game are executed to virtually reach (e.g., virtually travel to and reach) a virtual end goal 206a that is a virtual representation of the end goal 206 (shown in FIGS. 5A and 5B) for the virtual ego agent 102a presented within the action space of the stochastic game. Additionally or alternatively, the stochastic game is executed to virtually reach a virtual end goal 208a (shown in FIGS. 5A and 5B) for the virtual target agent 104a presented within the action space of the stochastic game.

The execution of one or more iterations of the stochastic game may enable the learning of a policy through training of the neural network 108 to reach the respective end goals 206, 208 of the ego vehicle 102 and/or the target vehicle 104 in a safe and efficient manner within the crowded environment 200. Stated differently, the execution of one or more iterations of the stochastic game allow the application 106 to determine a pathway for the ego vehicle 102 and/or a pathway for the target vehicle 104 to follow (e.g., by being autonomously controlled to follow) to reach their respective intended end goals 206, 208 without any intersection between the ego vehicle 102 and the target vehicle 104 and without any impact with the boundaries 204a-204d of the pathway 202 and/or one or more objects 210 located on or within the proximity of the pathway 202.

In one embodiment, each iteration of the stochastic game may be executed as a tuple (S, A P, R), where S is a set of states, and $A=\{A^1 \ldots A^m\}$ is the action space consisting of the set of each of the virtual ego agent's actions and/or the virtual target agent's actions. As disclosed above, m denotes the number of total agents within the action space. The reward functions $R=\{R^1 \ldots R^m\}$ describes the reward for each of the virtual ego agent 102a and the virtual target agent 104a S*A→R.

As discussed, the reward function may be output in one or more reward formats discussed below that may be chosen by the game execution module 134 based on the model (discrete or continuous) which is implemented. The reward function that is output based on the execution of the stochastic game may be assigned to the virtual ego agent 102a and/or the virtual target agent 104a to be utilized to determine one or more real-world travel paths to allow the ego vehicle 102 and/or the target vehicle 104 to autonomously navigate to their respective end goals in the real-world environment of the vehicles 102, 104. A transition probability function P: S*A*S→[0,1] may be used to describe how the state evolves in response to the collection actions of the virtual ego agent 102a and the virtual target agent 104a within the action space.

Accordingly, the game execution module 134 executes one or more iterations of the stochastic game to learn a policy $\pi^1$ to train the neural network 108 to maximize the expected return: $\Sigma_{t=0}^{T-1} \gamma^t \pi_t^i$ where $0<\gamma<1$ is a discount factor that imposes a decaying credit assignment as time increases and allows for numerical stability in the case of infinite horizons. In one configuration, the stochastic game may utilize a reward format that assigns a different reward value to the virtual ego agent 102a at each time step and to the virtual target agent 104a at each time step. This functionality may allow the rewards to be independent.

In some configurations, another reward format may include rewards between the virtual ego agent 102a and the virtual target agent 104a to be correlated. For example, in an adversarial setting like a zero sum game $\Sigma_{i=1}^m r^i=0$, a particular virtual ego agent 102a may receive a reward which results in a particular virtual target agent 104a receiving a penalty (e.g., a negative point value). In additional configurations, an additional reward format may include rewards that may be structured to encourage cooperation between the virtual ego agent 102a and the virtual target agent 104a. For example, a reward may be utilized for the virtual ego agent 102a and the virtual target agent 104a $r^{i'}=r^i+ar^j$, where a is a constant that adjusts the agent's attitude towards being cooperative.

In one embodiment, within the discrete domain model 500 utilized for each stochastic game, the virtual ego agent 102a and the virtual target agent 104a have four discrete action options: up, down, left, and/or right. Within each stochastic game within the discrete domain model, the virtual ego agent 102a and/or the virtual target agent 104a is also configured to stop moving when they reach their respective end goals.

In an illustrative embodiment, with respect to an exemplary reward format applied within the discrete domain model, the game execution module 134 may assign a −0.01 step cost, a +0.5 reward for intersection of the agents (e.g., virtual ego agent 102a intersecting with the virtual target agent 104a) or virtual impact with one or more boundaries 204a-204d (virtual boundaries not numbered in FIG. 5A and FIG. 5B) of the pathway 202, and one or more virtual objects 210a located on the pathway 202 on which the virtual ego agent 102a and the virtual target agent 104a are traveling.

In one embodiment, within the discrete domain model, a particular reward format may include rewarding both of the virtual ego agent 102a and the virtual target agent 104a for both reaching their respective virtual end goals 206a, 208a. For example, the virtual ego agent 102a and the virtual target agent 104a may be assigned with a reward of +1 if both the virtual ego agent 102a and the virtual target agent 104a reach their respective virtual end goals 206a, 208a without intersection and/or virtual impact with one or more boundaries of the pathway (virtual pathway of the action space that represents the pathway 202) and/or one or virtual objects 210a located on the pathway. This reward structure sets an explicit reward for collaboration.

In another embodiment, in another reward format within the discrete domain model of the action space, the virtual ego agent 102a and/or the virtual target agent 104a may be encouraged to follow a virtual central axis of the pathway (virtual pathway not numbered in FIG. 5A and FIG. 5B) traveled by the virtual ego agent 102a and the virtual target agent 104a. Accordingly, the reward format penalizes lateral motions conducted by the virtual ego agent 102a and/or the virtual target agent 104a. Consequently, this reward format may encourage the virtual ego agent 102a and/or the virtual target agent 104a to deviate from a central path on the pathway as little as possible and may drive the agents 102a, 102b to interact with each other as they travel towards their intended virtual end goals 206a, 208a. In one configuration, the module 136 may thereby execute the stochastic game to implement the reward format that includes a −0.001 d reward where d is the distance from the central axis.

In some embodiments, the game execution module 134 may add uncertainty to both the state and action within the discrete domain model of the action space. In particular, within the discrete domain model, the virtual ego agent 102a and/or the virtual target agent 104a may take a random action with probability n. Therefore, in one or more iterations of the stochastic game, the game execution module 134 may be executed using different amounts of randomness n={0.0, 0.1, 0.2}.

In an exemplary embodiment, within the continuous domain model utilized for each stochastic game, the virtual ego agent 102a and the virtual target agent 104a may move forward, backward, and/or rotate. Within each stochastic game within the continuous domain model, the action space is two dimensional. Control of the virtual ego agent 102a and/or the virtual target agent 104a may be made by accelerating and rotating. The rotations may be bounded by $\pm\pi/8$ per time step and accelerations may be bounded by $\pm 1.0$ m/s$^2$. The control may be selected to ensure that the virtual ego agent 102a and/or the virtual target agent 104a may not instantaneously stop.

In an illustrative embodiment, with respect to the continuous domain model, the module 136 may utilize a reward format which assigns a +0.5 reward to the virtual ego agent 102a for reaching the virtual end goal 206a and/or the virtual target agent 104a for reaching the virtual end goal 208a. The reward format may also include assigning of a −0.5 reward to the virtual ego agent 102a and/or the virtual target agent 104a for causing a virtual intersection between the agents 102a, 104b.

In one configuration, the game execution module 134 may implement another reward format that includes potential based reward shaping (in place of a step cost) that makes states further from the respective virtual end goals 206a, 208a more negative and thereby provides a gradient signal that encourages the virtual ego agent 102 to move towards the end goal 206 and/or the virtual target agent 104a to move towards the end goal 208. In one configuration, the module 136 may thereby execute the stochastic game to implement the reward format that includes a −0.0001 d$^2$ reward per time step.

In some embodiments, the game execution module 134 may add uncertainty to both the state and action within the continuous domain model of the action space. In particular, within the continuous domain model, one or more iterations of the stochastic game may be executed to add uniformly distributed random noise to the actions and observations. The noise $\in$ is selected from the ranges $\in$={±0.01, ±0.5, ±1.5}.

In an exemplary embodiment, within the discrete and/or continuous domain models of the action space, the game execution module 134 may execute one or more iterations of the stochastic games to implement a reward format that may be utilized to determine the shortest travel path from the virtual ego agent 102a to the virtual end goal 206a and/or the shortest travel path from the virtual target agent 104a to the virtual end goal 208a. In one aspect, the reward format that rewards the shortest travel paths to the respective end goals 206, 208 may be computed using Dijkstra's algorithm. As known in the art, Dijkstra's algorithm may be utilized to find the shortest paths which may represent road networks.

In one or more embodiments, the game execution module 134 may communicate with the camera system 116a of the ego vehicle 102 and/or the camera system 116a of the target vehicle 104 to acquire image data. The game execution module 134 may evaluate the image data and the one or more sets of action space coordinates to determine pixels associated with each several portions of the action space. As discussed, the one or more sets of action space coordinates may include positional coordinates (e.g., x, y grid world coordinates) that represent the ego vehicle 102, the target vehicle 104, the boundaries 204a-204d of the pathway, one or more end goals 206, 208 associated with the ego vehicle 102 and/or the target vehicle 104 (defined based on the source of the image data and/or the LiDAR data), and any objects 210 on or near the pathway 202.

Figure 6A:
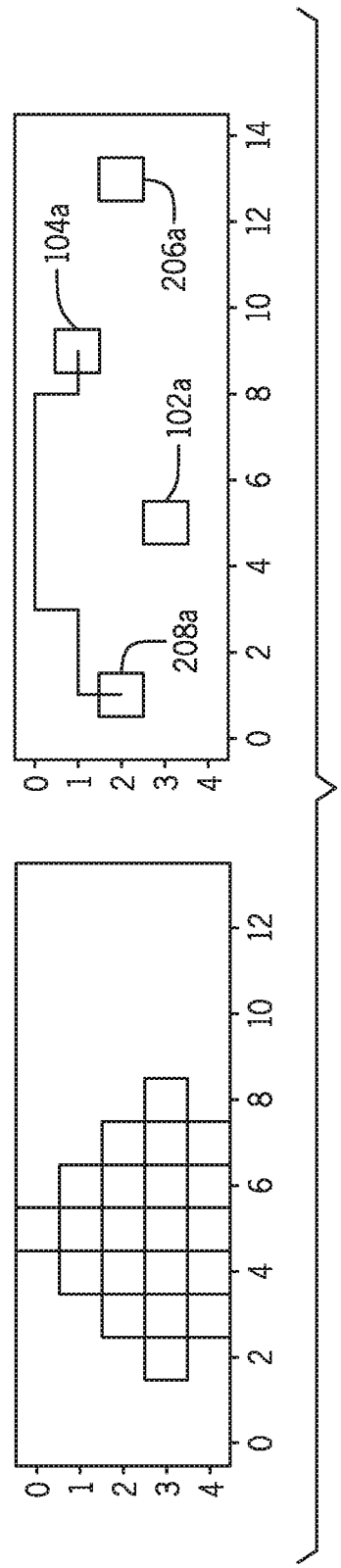
FIG. 6A is an illustrative example of reward format that is based on a cost map according to an exemplary embodiment of the present disclosure.

FIG. 6A is an illustrative example of reward format that is based on a cost map according to an exemplary embodiment of the present disclosure. In one embodiment, the game execution module 134 may create the cost map of transitions that is created by weighing the pixels in a predetermined (close) proximity to the virtual ego agent 102a (that is the virtual representation of the ego vehicle 102 in the action space) and/or in a predetermined (close) proximity to the virtual target agent 104a (that is the virtual representation of the target vehicle 104 in the action space) as having a high cost. This reward format may be provided to promote an opposing virtual target agent 104a to navigate around the virtual ego agent 102a, as represented by FIG. 6A. Additionally, this reward format may be provided to promote an opposing virtual ego agent 102a to navigate around the virtual target agent 104a. In one embodiment, the shortest travel paths may be computed at each time step.

Figure 6B:
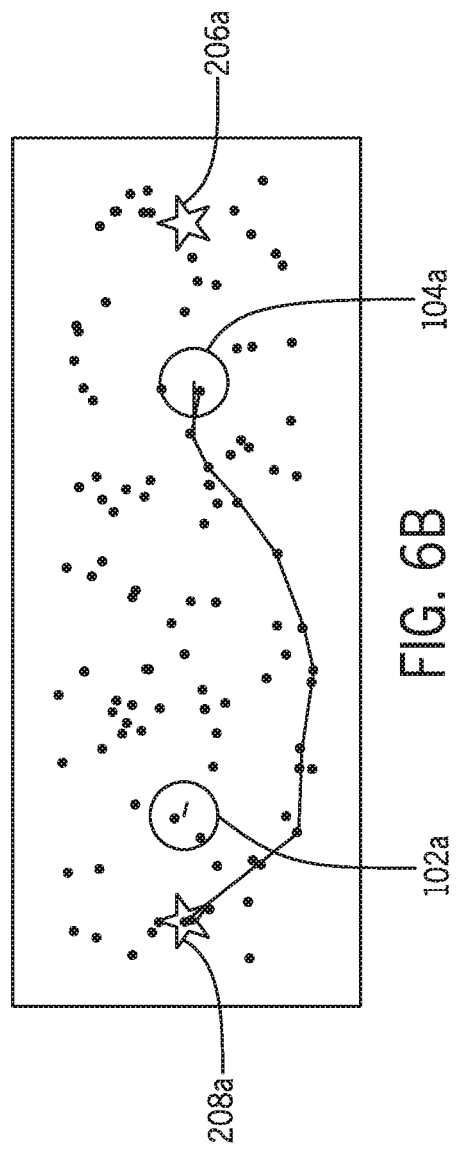
FIG. 6B is an illustrative example of a probabilistic roadmap according to an exemplary embodiment of the present disclosure.

FIG. 6B is an illustrative example of a probabilistic roadmap according to an exemplary embodiment of the present disclosure. In an exemplary embodiment, the game execution module 134 may utilize a probabilistic road map (PRM) to discretize the search before running the Dijkstra algorithm within the continuous domain model. In one configuration, in another reward format, the virtual ego agent 102a may get rewarded for moving out of the way of the virtual target agent 104a and avoiding the virtual intersection of the virtual ego agent 102a and the virtual target agent 104a. Additionally, or alternatively, the virtual target agent 104a may be rewarded for moving out of the way of the virtual ego agent 102a and avoiding the virtual intersection of the virtual ego agent 102a and the virtual target agent 104a.

Figure 7:
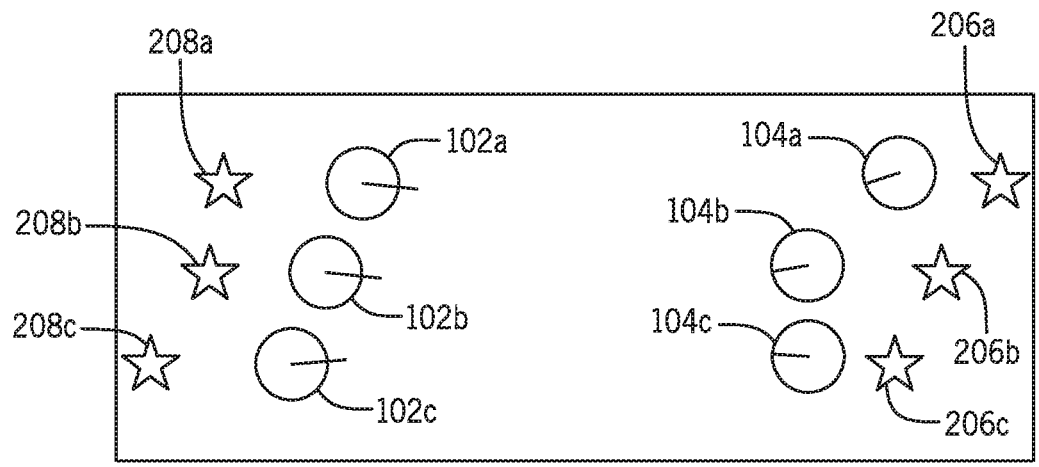
FIG. 7 is an illustrative example of multi-agent stochastic game according to an exemplary embodiment of the present disclosure.

In some embodiments, with reference to FIG. 7, an illustrative example of multi-agent stochastic game according to an exemplary embodiment of the present disclosure, the game execution module 134 may implement the stochastic game with one or more of the aforementioned reward formats with respect to multiple ego vehicles and multiple target vehicles. As shown, within the one or more iterations of stochastic games, the multiple ego vehicles may be represented by respective virtual ego agents 102a, 102b, 102c that may each be traveling on a pathway within the action space towards respective virtual end goals 206a, 206b, 206c (that represent the (real-world) end goals of the multiple ego vehicles). Multiple virtual target agents 104a, 104b, 104c that represent multiple target vehicles may also be provided that directly oppose the respective virtual ego agents 102a, 102b, 102c. Additionally, the multiple virtual target agents 104a, 104b, 104c may be traveling on the pathway within the action space towards respective end goals 208a, 208b, 208c.

In one embodiment, the action space determinant module 132 may determine the action space that represents the multiple agents as shown in FIG. 7 and the action space with the multiple end goals in order for the game execution module 134 to execute one or more iterations of the stochastic game in one or more reward formats discussed above to determine reward data in order to train the neural network 108 with respect to one or more travel paths that may be utilized by one or more of the agents 102a-102c, 104a-104c to reach their respective virtual end goals 206a-206c, 208a-208c without intersection on the pathway, without impacting any of the boundaries of the pathway and/or any objects located on or in proximity of the pathway.

Referring again to the method 400 of FIG. 4, the method 400 may proceed to block 406, wherein the method 400 may include training the neural network 108 with game reward data. In an exemplary embodiment, after execution of one or more iterations of the stochastic game until one or both of the virtual ego agent 102a and/or the virtual target agent 104a reach their respective end goals, the game execution module 134 may access the memory 130 and store reward data determined based on one or more of the reward formats of the stochastic game within the discrete domain model and/or the continuous domain model of the action space, as discussed above (with respect to block 404).

In one embodiment, the neural network training module 136 may access the memory 130 and may analyze the reward data to assign one or more weight values to one or more respective travel paths that may be utilized by the ego vehicle 102 and the target vehicle 104 to reach their respective end goals 206, 208. The weight values assigned to one or more respective travel paths may assigned as a numerical value (e.g., 1.000-10.000) that may be based on the reward(s) output from one or more iterations of the stochastic game and one or more types of reward formats of one or more iterations of the stochastic game to thereby provide the most safe and most efficient (i.e., least amount of traveling distance, least amount of traveling time) travel pathway to reach the respective end goals 206, 208. One or more additional factors that may influence the weight values may include a low propensity of intersection of the vehicles 102, 104, a low propensity of impact with the boundaries 204a-204d of the pathway 202 (based on a low propensity of virtual impact), a low propensity of impact with one or more objects 210 located within or in proximity of the pathway 202, and the like.

Upon accessing the reward data and assigning respective weight values to one or more of the travel paths, the neural network training module 136 may access the stochastic game machine learning dataset 112 and may populate one or more fields associated with each of the ego vehicle 102 and the target vehicle 104 with travel pathway geo-location information. The travel path geo-location information may be associated with one or more perspective travel pathways that may be respectively followed by the ego vehicle 102 and/or the target vehicle 104 to effectively and safely reach their respective end goals 206, 208.

More specifically, the travel path geo-location information may be provided for one or more perspective travel pathways that are assigned a weight that is compared against a predetermined weight threshold and is determined to be above the predetermined weight threshold. The predetermined weight threshold may be dynamically assigned by the crowd navigation application 106 based on the one or more reward formats utilized for the one or more iterations of the stochastic game executed by the game execution module 134.

Figure 8:
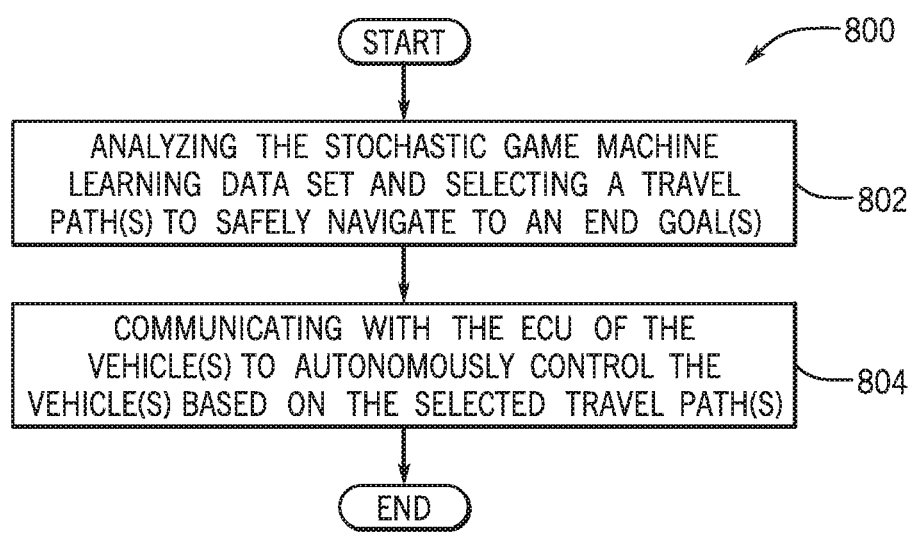
FIG. 8 is a process flow diagram of a method for controlling the ego vehicle and/or the target vehicle to navigate in a crowded environment based on the execution of the stochastic game according to an exemplary embodiment of the present disclosure.

FIG. 8 is a process flow diagram of a method 800 for controlling the ego vehicle 102 and/or the target vehicle 104 to navigate in a crowded environment 200 based on the execution of the stochastic game according to an exemplary embodiment of the present disclosure. FIG. 8 will be described with reference to the components of FIG. 1 and FIG. 2, though it is to be appreciated that the method of FIG. 8 may be used with other systems/components. The disclosure herein described the method 800 as applying to the ego vehicle 102 and the target vehicle 104. However, it is to be appreciated that the method 800 may apply to a plurality of ego vehicles and/or a plurality of target vehicles that are represented as a plurality of virtual ego agents and a plurality of virtual target agents (as discussed above with respect to FIG. 7).

The method 800 may begin at block 802, wherein the method 800 may include analyzing the stochastic game machine learning data set and selecting a travel path(s) to safely navigate to an end goal(s). In an exemplary embodiment, the vehicle control module 138 may access the stochastic game machine learning dataset 112 and may analyze the weight values associated with each of the perspective travel paths. In one configuration, the vehicle control module 138 may select a perspective travel path for the ego vehicle 102 and/or the target vehicle 104 based on the perspective travel path(s) with the highest weight value (as assigned by the neural network training module 136).

In some configurations, if more than one perspective travel path for the ego vehicle 102 and/or the target vehicle 104 is assigned the highest weight value (e.g., two perspective travel paths for the ego vehicle 102 are both assigned an equivalent highest weight value), the vehicle control module 138 may communicate with the game execution module 134 to determine a most prevalent reward format that was utilized for the one or more iterations of the stochastic game. In other words, the vehicle control module 138 may determine which reward format was most prevalently utilized to determine rewards associated with the virtual ego agent 102a and/or the virtual target agent 104a to determine one or more perspective travel paths to reach respective end goals 206, 208.

The virtual control module 140 may thereby select the perspective travel path for the ego vehicle 102 and/or the target vehicle 104 according to the perspective travel path(s) with the highest weight based on the most prevalent reward format utilized within one or more iterations of the stochastic game. As an illustrative example, if most of the plurality of iterations of the stochastic game utilized a reward format that rewards the virtual ego agent 102a and/or the virtual target agent 104a that follow a virtual central axis of the pathway, the virtual control module 140 may thereby select the perspective travel path that is weighted high based on the following of the central axis by the virtual ego agent 102a and/or the virtual target agent 104a in order to autonomously control the ego vehicle 102 and/or the target vehicle 104 to minimize lateral motions conducted during travel to the respective end goals 206, 208.

The method 800 may proceed to block 804, wherein the method 800 may include communicating with the ECU 110a, 110b of the vehicle(s) 102, 104 to autonomously control the vehicle(s) 102, 104 based on the selected travel path(s). In an exemplary embodiment, upon selecting a travel path to safely navigate the ego vehicle 102 to an end goal 206 and/or selecting a travel path to safely navigate the ego vehicle 102 to an end goal 208, the vehicle control module 138 may thereby communicate with the ECU 110a of the ego vehicle 102 and/or the ECU 110b of the target vehicle 104 to autonomously control the ego vehicle 102 and/or the target vehicle 104 to be driven within the crowded environment 200 to follow the respective travel path(s) to the respective end goal(s) 206, 208. The ECU(s) 110a, 110b may communicate with one or more of the respective systems/control units (not shown) to thereby control the ego vehicle 102 and/or the target vehicle 104 to be driven autonomously based on the execution of the stochastic game to thereby control the ego vehicle 102 and/or the target vehicle 104 to safely and efficiently navigate to their respective end goals 206, 208.

As an illustrative example, with reference to FIG. 2, the vehicle control module 138 may communicate with the systems/control units of the ego vehicle 102 and the target vehicle 104 to navigate (e.g., with the application of a particular speed, acceleration, steering angle, throttle angle, braking force, etc.) to reach their respective end goals 206, 208 without intersection of the vehicles 102, 104 and without impact with the boundaries 204a-204d of the pathway 202 and/or the object(s) 210 on or in proximity of the pathway 202. The ego vehicle 102 may thereby be controlled to be autonomously driven within the crowded environment 200 to reach the end goal 206 using the selected travel path labeled as ego path 1. Additionally, the target vehicle 104 may thereby be controlled to be autonomously driven within the crowded environment 200 to reach the end goal 208 using the selected travel path labeled as the target path 1.

Figure 9:
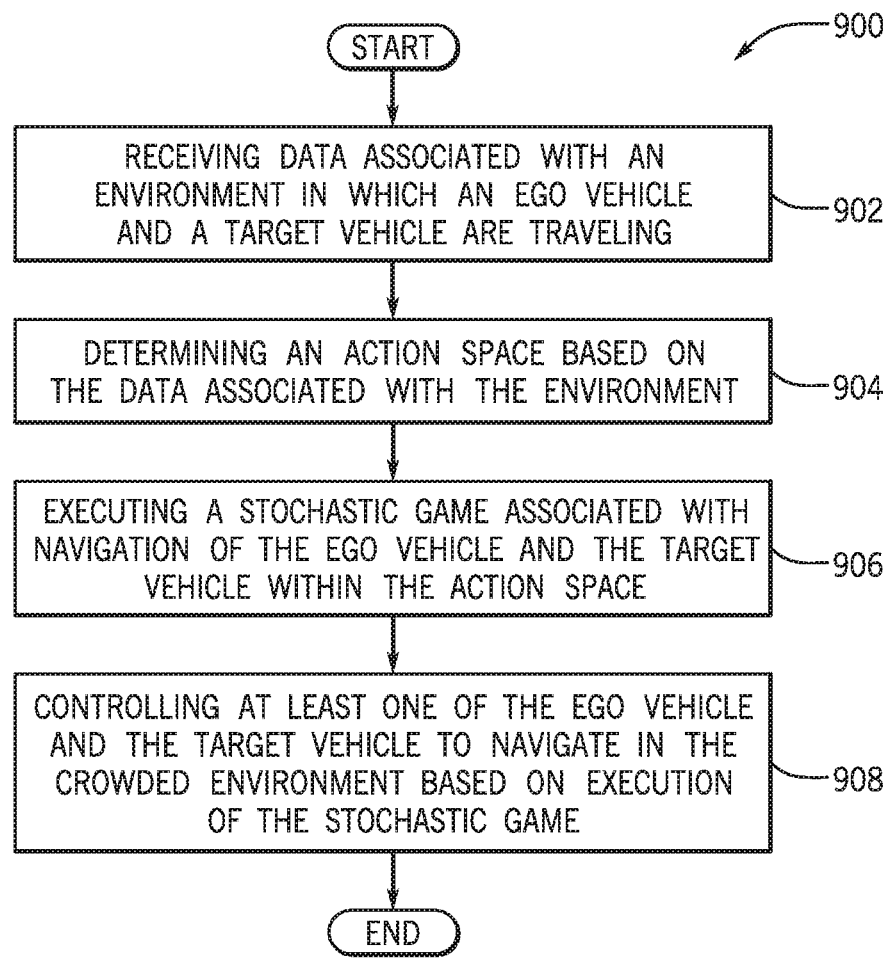
FIG. 9 is a process flow diagram of a method for providing autonomous vehicular navigation within a crowded environment according to an exemplary embodiment of the present disclosure.

FIG. 9 is a process flow diagram of a method 900 for providing autonomous vehicular navigation within a crowded environment 200 according to an exemplary embodiment of the present disclosure. FIG. 9 will be described with reference to the components of FIG. 1 and FIG. 2, though it is to be appreciated that the method of FIG. 9 may be used with other systems/components. The method 900 may begin at block 902, wherein the method 900 may include receiving data associated with an environment in which an ego vehicle 102 and a target vehicle 104 are traveling.

The method 900 may proceed to block 904, wherein the method 900 may include determining an action space based on the data associated with the environment. The method 900 may proceed to block 906, wherein the method 900 may include executing a stochastic game associated with the navigation of the ego vehicle 102 and the target vehicle 104 within the action space. As discussed above, in one embodiment, the neural network 108 is trained with stochastic game reward data based on the execution of the stochastic game. The method 900 may proceed to block 908 wherein the method 900 may include controlling at least one of the ego vehicle 102 and the target vehicle 104 to navigate in the crowded environment 200 based on the execution of the stochastic game.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing autonomous vehicular navigation within a crowded environment, comprising:
    receiving data associated with the crowded environment in which an ego vehicle and a target vehicle are traveling, wherein the data includes image data and LiDAR data from the ego vehicle and the target vehicle;
    determining an action space based on the data associated with the crowded environment, wherein the action space is determined based on an aggregation of image data received from the ego vehicle and the target vehicle and an aggregation of LiDAR data received from the ego vehicle and the target vehicle, wherein the action space is a virtual representation of the crowded environment;
    executing a stochastic game associated with navigation of the ego vehicle and the target vehicle within the action space, wherein a neural network is trained with stochastic game reward data based on the execution of the stochastic game; and
    controlling at least one of the ego vehicle and the target vehicle to navigate in the crowded environment based on execution of the stochastic game.

2. The computer-implemented method of claim 1, wherein aggregated image data and aggregated LiDAR data are aggregated into fused environmental data that is associated with the crowded environment.

3. The computer-implemented method of claim 2, wherein determining the action space includes evaluating the fused environmental data and determining at least one set of action space coordinates that correspond to the action space, wherein the action space is a virtual grid world that is representative of the crowded environment.

4. The computer-implemented method of claim 3, wherein the at least one set of action space coordinates include positional coordinates that represent the ego vehicle, the target vehicle, a pathway on which the ego vehicle and target vehicle are traveling, an end goal of the ego vehicle, and an end goal of the target vehicle.

5. The computer-implemented method of claim 3, wherein determining the action space includes evaluating the at least one set of the action space coordinates and determining at least one model of the action space, wherein the at least one model of the action space is utilized in at least one iteration of the stochastic game.

6. The computer-implemented method of claim 5, wherein executing the stochastic game includes executing the at least one iteration of the stochastic game with at least one model of the action space configured as at least one of: a discrete domain model and a continuous domain model.

7. The computer-implemented method of claim 6, wherein executing the stochastic game includes implementing a reward format in the discrete domain model that includes rewarding a virtual ego agent that represents the ego vehicle and a virtual target agent that represents the target vehicle for reaching a respective virtual end goal without intersection.

8. The computer-implemented method of claim 7, wherein executing the stochastic game includes implementing the reward format in the continuous domain model that includes implementing potential based reward shaping that makes states further from respective virtual end goals negative and provides a gradient signal that encourages the virtual ego agent and the virtual target agent to move toward the respective virtual end goal.

9. The computer-implemented method of claim 8, wherein controlling at least one of the ego vehicle and the target vehicle includes accessing the neural network to evaluate the game reward data and the reward format implemented during the at least one iteration of the stochastic game to determine a travel path to autonomously navigate at least one of: the ego vehicle and the target vehicle in the crowded environment.

10. A system for providing autonomous vehicular navigation within a crowded environment, comprising:
a memory storing instructions when executed by a processor cause the processor to:
receive data associated with the crowded environment in which an ego vehicle and a target vehicle are traveling, wherein the data includes image data and LiDAR data from the ego vehicle and the target vehicle;
determine an action space based on the data associated with the crowded environment, wherein the action space is determined based on an aggregation of image data received from the ego vehicle and the target vehicle and an aggregation of LiDAR data received from the ego vehicle and the target vehicle, wherein the action space is a virtual representation of the crowded environment;
execute a stochastic game associated with navigation of the ego vehicle and the target vehicle within the action space, wherein a neural network is trained with stochastic game reward data based on the execution of the stochastic game; and
control at least one of the ego vehicle and the target vehicle to navigate in the crowded environment based on execution of the stochastic game.

11. The system of claim 10, wherein aggregated image data and aggregated LiDAR data are aggregated into fused environmental data that is associated with the crowded environment.

12. The system of claim 11, wherein determining the action space includes evaluating the fused environmental data and determining at least one set of action space coordinates that correspond to the action space, wherein the action space is a virtual grid world that is representative of the crowded environment.

13. The system of claim 12, wherein the at least one set of action space coordinates include positional coordinates that represent the ego vehicle, the target vehicle, a pathway on which the ego vehicle and target vehicle are traveling, an end goal of the ego vehicle, and an end goal of the target vehicle.

14. The system of claim 12, wherein determining the action space includes evaluating the at least one set of the action space coordinates and determining at least one model of the action space, wherein the at least one model of the action space is utilized in at least one iteration of the stochastic game.

15. The system of claim 14, wherein executing the stochastic game includes executing the at least one iteration of the stochastic game with at least one model of the action space configured as at least one of: a discrete domain model and a continuous domain model.

16. The system of claim 15, wherein executing the stochastic game includes implementing a reward format in the discrete domain model that includes rewarding a virtual ego agent that represents the ego vehicle and a virtual target agent that represents the target vehicle for reaching a respective virtual end goal without intersection.

17. The system of claim 16, wherein executing the stochastic game includes implementing the reward format in the continuous domain model that includes implementing potential based reward shaping that makes states further from respective virtual end goals negative and provides a gradient signal that encourages the virtual ego agent and the virtual target agent to move toward the respective virtual end goal.

18. The system of claim 17, wherein controlling at least one of the ego vehicle and the target vehicle includes accessing the neural network to evaluate the game reward data and the reward format implemented during the at least one iteration of the stochastic game to determine a travel path to autonomously navigate at least one of: the ego vehicle and the target vehicle in the crowded environment.

19. A non-transitory computer readable storage medium storing instructions that when executed by a computer, which includes a processor perform a method, the method comprising:
receiving data associated with a crowded environment in which an ego vehicle and a target vehicle are traveling, wherein the data includes image data and LiDAR data from the ego vehicle and the target vehicle;
determining an action space based on the data associated with the crowded environment, wherein the action space is determined based on an aggregation of image data received from the ego vehicle and the target vehicle and an aggregation of LiDAR data received from the ego vehicle and the target vehicle, wherein the action space is a virtual representation of the crowded environment;
executing a stochastic game associated with navigation of the ego vehicle and the target vehicle within the action space, wherein a neural network is trained with stochastic game reward data based on the execution of the stochastic game; and
controlling at least one of the ego vehicle and the target vehicle to navigate in the crowded environment based on execution of the stochastic game.

20. The non-transitory computer readable storage medium of claim 19, wherein controlling at least one of the ego vehicle and the target vehicle includes accessing the neural network to evaluate game reward data and a reward format implemented during at least one iteration of the stochastic game to determine a travel path to autonomously navigate at least one of: the ego vehicle and the target vehicle in the crowded environment.

* * * * *